United States Patent [19]
Takahashi

[11] Patent Number: 6,046,874
[45] Date of Patent: *Apr. 4, 2000

[54] REPRODUCTION APPARATUS USING MULTIPLE PARTIAL RESPONSE MAXIMUM LIKELIHOOD DETECTION SYSTEMS

[75] Inventor: Tsuyoshi Takahashi, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/570,233

[22] Filed: Dec. 11, 1995

[30] Foreign Application Priority Data

Apr. 20, 1995 [JP] Japan .................................. 7-095133

[51] Int. Cl.⁷ .............................. G11B 5/035; G11B 5/09
[52] U.S. Cl. ................................ 360/65; 360/46; 360/53
[58] Field of Search ................................. 360/46, 53, 61, 360/65; 369/53, 54, 59; 375/231, 232, 263

[56] References Cited

U.S. PATENT DOCUMENTS

| | | | |
|---|---|---|---|
| 5,121,266 | 6/1992 | Ito et al. ............................ | 360/65 |
| 5,291,499 | 3/1994 | Behrens et al. ....................... | 371/43.8 |
| 5,299,070 | 3/1994 | Takahashi et al. .................... | 360/61 X |
| 5,422,760 | 6/1995 | Abbott et al. ........................ | 360/65 X |
| 5,543,978 | 8/1996 | Park ..................................... | 360/65 |
| 5,557,482 | 9/1996 | Christensen et al. ................ | 360/61 X |
| 5,563,746 | 10/1996 | Bliss .................................... | 360/65 X |
| 5,619,539 | 4/1997 | Coker et al. ........................... | 360/51 |
| 5,809,406 | 9/1998 | Taki et al. ............................. | 375/232 |

FOREIGN PATENT DOCUMENTS 2-150114 6/1990 Japan .
6-177771 6/1994 Japan .

Primary Examiner—Glenton B. Burgess
Assistant Examiner—Regina Y. Neal
Attorney, Agent, or Firm—Greer, Burns & Crain, Ltd.

[57] ABSTRACT

A first equalizer of a partial response system such as PR4 and a second equalizer of an extended partial response such as EPR4 are provided and are switched by a selector to the equalizer in which an error rate is reduced and an equalization is executed. After that, read data is decoded by a maximum likelihood detection by a decoder.

5 Claims, 10 Drawing Sheets

FIG. 5

| CYLINDER ZONE NO. \ HEAD NO. | HH1 | HH2 | HH3 | HH4 |
|---|---|---|---|---|
| Z1 | PR4 | PR4 | PR4 | PR4 |
| Z2 | PR4 | PR4 | PR4 | PR4 |
| Z3 | PR4 | PR4 | PR4 | PR4 |
| Z4 | PR4 | PR4 | PR4 | EPR4 |
| Z5 | PR4 | EPR4 | PR4 | EPR4 |
| Z6 | EPR4 | EPR4 | EPR4 | EPR4 |
| Z7 | EPR4 | EPR4 | EPR4 | EPR4 |
| ⋮ | ⋮ | ⋮ | ⋮ | ⋮ |
| Zm−1 | EPR4 | EPR4 | EPR4 | EPR4 |
| Zm | EPR4 | EPR4 | EPR4 | EPR4 |

94

OUTER ↑ / INNER ↓

FIG. 6

| | ZONE NO. | CLOCK PERIOD | HALF VALUE WIDTH | STANDARDIZED LINEAR DENSITY |
|---|---|---|---|---|
| OUTER ↑ | Z1 | T1 | W1 | K1 |
| | Z2 | T2 | W2 | K2 |
| | Z3 | T3 | W3 | K3 |
| | Z4 | T4 | W4 | K4 |
| | Z5 | T5 | W5 | K5 |
| | Z6 | T6 | W6 | K6 |
| | Z7 | T7 | W7 | K7 |
| | ⋮ | ⋮ | ⋮ | ⋮ |
| ↓ | Zm−1 | Tm−1 | Wm−1 | Km−1 |
| INNER | Zm | Tm | Wm | Km |

REPRODUCTION APPARATUS USING MULTIPLE PARTIAL RESPONSE MAXIMUM LIKELIHOOD DETECTION SYSTEMS

BACKGROUND OF THE INVENTION

The invention relates to a reproducing apparatus for demodulating a head read signal by using a partial response maximum likelihood detection and, more particularly, to a reproducing apparatus of a magnetic disk apparatus or the like having a demodulating circuit of a partial response class 4 and a demodulating circuit of an extended partial response class 4.

In recent years, a high speed and a miniaturization of a computer have been advanced. Even in a magnetic disk apparatus which is a main stream in external memory apparatuses of computers, similarly, a request for realizing a high speed and a miniaturization of the apparatus is increasing. In response to such a request, in order to realize the high speed and the miniaturization of the magnetic disk apparatus, various kinds of developments of an LSI to realize a high speed transfer and developments and improvements of a head and a magnetic disk medium to accomplish a high recording density have been performed. As a method of accomplishing such high speed transfer and high density recording of the magnetic disk apparatus, in recent years, a partial response system has been developed and the use of such a system in a demodulating circuit of read data has been started. However, it is further necessary to improve the high speed transfer and high density recording.

Hitherto, a peak detecting circuit has been used as a demodulating circuit of the magnetic disk apparatus. Recently, however, since a high speed of a circuit and a high density of a magnetic disk medium have been advanced, the demodulating circuit for the peak detection reaches a limitation, so that the use of a partial response class 4 maximum likelihood detection (hereinbelow, referred to as a "PR4ML") has been started in recent years. Even in the PR4ML demodulating circuit, when the realization of the high density of the magnetic disk medium is further progressed, there is a limitation even in case of further reducing a desired S/N ratio which is necessary to obtain a predetermined bit error rate by the maximum likelihood decoding. As a method of further improving the performance of such a PR4ML demodulating circuit, an extended partial response class 4 maximum likelihood detection (hereinbelow, referred to as an "EPR4ML") has been proposed.

SUMMARY OF THE INVENTION

With respect to the present magnetic disk apparatus, however, in case of comparing the PR4ML demodulating circuit and the EPR4ML demodulating circuit, an error rate of the EPR4ML demodulating circuit is not always low. Depending on a head or a cylinder address, there is a case where the error rate of the PR4ML demodulating circuit is low. For example, in case of a constant angular velocity recording (CAVR) in which a write clock frequency is set to be constant in all of cylinder addresses, it is known that the error rate of the PR4ML demodulating circuit is low on the outer side on which a peripheral velocity is high and that, on the contrary, the error rate of the EPR4ML demodulating circuit is low on the inner side on which the peripheral velocity is low. In case of a constant density recording (CDR) in which a cylinder is divided into zones and a write clock frequency that is peculiar to the zone is used, there is a tendency such that on the outer side of a high peripheral velocity, the error rate of the EPR4ML demodulating circuit is high and that, on the inner side of a low peripheral velocity, the error rate of the PR4ML demodulating circuit is low.

According to the invention, an attention is paid to a fact that a difference of error rates between a partial response maximum likelihood demodulating circuit (PRML) and an extended partial response maximum likelihood demodulating circuit (EPRML) occurs depending on a head or a cylinder address, there is provided a reproducing apparatus in which by providing both of the PRML demodulating circuit and EPRML demodulating circuit as demodulating circuits and by selecting either one of them, an error rate is further improved for realization of a high speed and a high density and the reliability is improved.

The inventors of the present invention have determined that, for example, the difference in the error rate between the PR4ML demodulating circuit and the EPR4ML demodulating circuit depends on characteristics of a read waveform of the head. As characteristics of the head read waveform, the inventors devised a desired S/N ratio [dB] necessary to obtain a predetermined bit error rate by a maximum likelihood decoding by using a standardized linear density (K) which is defined by a ratio between a half value width W50 of an isolated waveform and a sampling period (T) of a read signal. Assuming that the amplitude half value width of the isolated waveform is set to W50 and the signal sampling period is set to (T), the standardized linear density (K) is obtained by the following equation.

$$K = W50/T$$

As for the relation of the desired S/N ratio to the standardized linear density (K), a reversing phenomenon such that when a point (P) near a portion of K=1.3 is set to a boundary, a desired S/N ratio of the PR4ML demodulating circuit is low in the portion in which the standardized linear density (K) is low and the desired S/N ratio of the EPR4ML demodulating circuit is low in the portion in which the standardized linear density (K) is high can be confirmed. Accordingly, the invention is characterized in that the amplitude half value width W50 of the isolated read waveform according to the head number or cylinder address is measured, the standardized linear density (K) is obtained and, for example, between the PR4ML demodulating circuit and the EPR4ML demodulating circuit, the demodulating circuit is switched to the demodulating circuit in which the desired S/N ratio is low, namely, a low error rate is obtained, thereby demodulating.

That is, the invention fundamentally comprises: a plurality of equalizing means to each of which a read signal read from a memory medium by a head is inputted and each of which equalizes the read signal; selecting means for selecting the equalizing means that is optimum for demodulation of the read signal; and decoding means for decoding information of the memory medium on the basis of an equalization signal outputted from the equalizing means selected by the selecting means. For example, as a plurality of equalizing means, there are provided first equalizing means of the partial response system for equalizing the read signal and second equalizing means of the extended partial response system. The selecting means selects equalizing means that is optimum for demodulation of the read signal. On the basis of an equalization signal outputted from the equalizing means selected by the selecting means, the decoding means decodes information of the memory medium.

More specifically, there are provided: first equalizing means for equalizing the read signal from the head by regarding a magnetic converting system having a medium and a head as a transmitting system (transmitting channel) of the partial response class 4 (PR4); and second equalizing means for equalizing the read signal from the head by regarding a magnetic recording system as a converting system of the extended partial response class 4 (EPR4). The selecting means selects the optimum means in which the error rate is low between the first and second equalizing means. The decoding means decodes the read data by a maximum likelihood detection on the basis of the equalization signal from the selected first or second equalizing means.

In this instance, the selecting means registers selection information to select an optimum one of the first and second equalizing means every head or every head and cylinder address and selects the first or second equalizing means by the head number obtained by the read access with reference to selection information registering means. Selection information means stores the selection information of the first or second equalizing means on the basis of the half value width of the isolated waveform read signal read by the head. Further specifically speaking, the selection information means stores the selection information of the first or second equalizing means on the basis of the standardized linear density (K) obtained by dividing the half value width W50 of the isolated waveform read signal read by the head by a sampling period (T). In case of the constant angular velocity recording (CAVR) in which the sampling period of the read signal is constant in all of the cylinder addresses, the selection information registering means stores the selection information of the first equalizing means to the outer side on which the standardized linear density (K) is equal to or less than a specific value and stores the selection information of the second equalizing means to the inner side on which the standardized linear density (K) is larger than the specific value. Further, in case of the constant density recording (CDR) in which the sampling period of the read signal sequentially increases from the outer side to the inner side, every cylinder zone obtained by dividing into a plurality of zones, when the standardized linear density (K) obtained by dividing the half value width W50 of the isolated waveform obtained in each cylinder zone by the sampling period (T) that is peculiar to the zone is equal to or less than the specific value, the selection information registering means stores the selection information of the first equalizing means and, when the standardized linear density (K) is larger than the specific value, the selection information registering means stores the selection information of the second equalizing means.

The reproducing apparatus of the invention also has filter circuits for performing a pre-equalization at the front stage of the first and second equalizing means. In this case, the selecting means switches a filter constant, namely, a cut-off frequency Fc and a boost Fb of the filter circuit in accordance with the selection of the first or second equalizing means. Further, the cut-off frequency Fc and boost Fb can be also switched by the head No. and cylinder address. The reproducing apparatus of the invention further has automatic gain control means for controlling a gain of automatic gain amplifying means provided at the front stage of the first and second equalizing means. In this case, the selecting means switches a sampling point of the equalized read signal which is kept to a constant level by the automatic gain control means in accordance with the selection of the first or second equalizing means. The reproducing apparatus of the invention also has timing control means (VFO means) for generating a clock signal for timing from the equalized read signal. In such a case, the selecting means switches a timing extracting point of the equalized read signal in correspondence to the selection of the first or second equalizing means.

The reproducing apparatus of the present invention is suitable for an error recovery. For example, when an error occurs in the reading operation in which the first equalizing means was selected, the apparatus switches the selection to the second equalizing means and retries. In the case where an error occurs in the reading operation in which the second equalizing means was selected, the apparatus switches the selection to the first equalizing means and retries. Further, in the disk apparatus of the invention, an MR head using a magnetoresistive element is used as a read head.

Further, the reproducing apparatus of the invention can be also constructed in a manner such that as a plurality of equalizing means, there are provided the first equalizing means for equalizing the read signal from the head by regarding the magnetic converting system having a medium and a head as a transmitting system of the extended partial response (for example, EPR4) and third equalizing means for equalizing the read signal from the read head by regarding the magnetic converting system as a transmitting system of a double extended partial response (for example, EEPR4), and the equalizing means is switched to the optimum equalizing means in which the error rate is low by the selecting means and the demodulation is performed.

According to the reproducing apparatus of the invention, an attention is paid to a fact that with respect to the demodulating circuits having, for example, the PR4 equalizing means and EPR4 equalizing means, there are characteristics such that the desired S/N ratio is reversed depending on the value of the standardized linear density (K) of the reproducing head, the optimum equalizing means in which the desired S/N ratio is low is selected by the head number and cylinder address at the time of the reading access and the demodulation is performed, so that the high error rate can be realized and the reliability can be raised.

The above and other objects, features, and advantages of the present invention will become more apparent from the following detailed description with reference to the drawings.

BRIEF DESCRIPTION OF THE DRAWINGS

FIG. 5 is an explanatory diagram of a demodulation switching table based on the characteristics diagram of FIG. 4;

FIG. 6 is an explanatory diagram showing relations among a cylinder zone No., a clock period, a half value width, and a standardized linear density in a constant density recording (CDR);

DETAILED DESCRIPTION OF THE PREFERRED EMBODIMENTS

Figure 1:
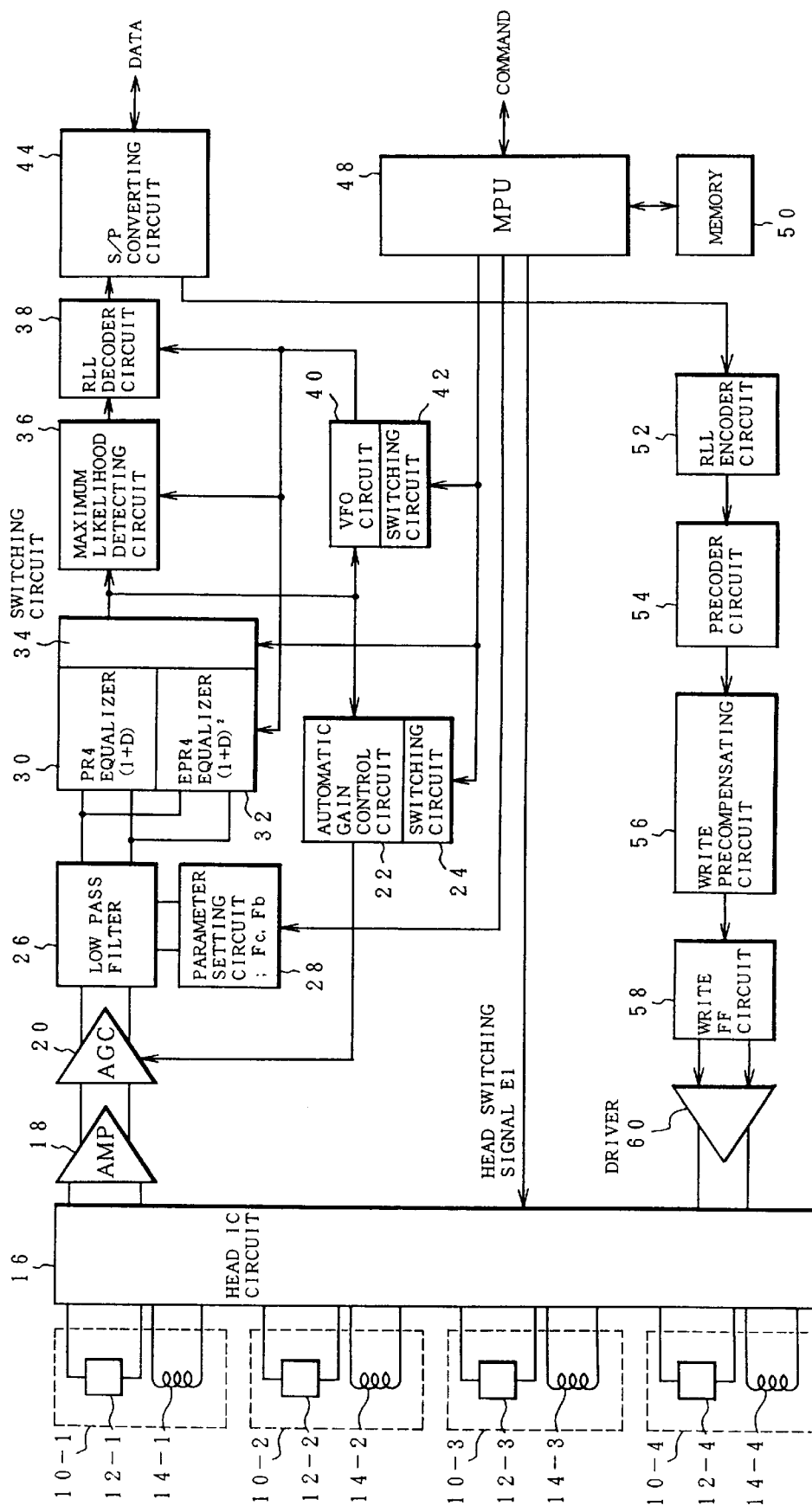
FIG. 1 is a block diagram showing an embodiment of the invention in which a PR4 demodulation and an EPR4 demodulation are switched.

FIG. 1 is a block diagram showing an embodiment of a disk apparatus of the invention. In the embodiment, four combination heads 10-1 to 10-4 are connected to a head IC circuit 16. The combination heads 10-1 to 10-4 have MR heads 12-1 to 12-4 which operate as read heads, and write heads 14-1 to 14-4, respectively. Each of the MR heads 12-1 to 12-4 uses a magnetoresistive element and reproduces information recorded on a disk medium in a state in which a specific sense current is supplied by the head IC circuit 16. Inductive heads are used as write heads 14-1 to 14-4. In accordance with a head switching signal from an MPU 48, at the time of the writing operation, the head IC circuit 16 selects either one of the write heads 14-1 to 14-4 and writes to the disk medium. At the time of the reading operation, the head IC circuit 16 selects either one of the MR heads 12-1 to 12-4 and outputs a read signal from the disk medium. A demodulating circuit of a reading system has a fixed gain amplifier 18, an automatic gain control amplifier 20, and a low pass filter 26. A gain of the automatic gain control amplifier 20 is controlled by an automatic gain control circuit 22. A parameter setting circuit 28 is provided for the low pass filter 26. The circuit 28 sets a cutoff frequency Fc and a boost Fb as filter constants and can adjust to optimum filter characteristics. Subsequent to the low pass filter 26, a PR4 equalizer (first equalizing means) 30 which is used for partial response class 4 maximum likelihood detection and an EPR4 equalizer (second equalizing means) 32 which is used for equalization of an extended partial response class 4 maximum likelihood detection are provided.

In this instance, a conversion polynomial in a magnetic recording system including a head and a magnetic disk medium can be regarded as a partial response system that is expressed by the following equation.

$$h(D)=(1-D)(1+D)^m$$

As for such a partial response system, as a linear density increases, a value of (m) also increases. The partial response system in case of (m=1) is called a partial response class 4. The partial response system in case of (m=2) is called an extended partial response class 4.

In the following description, the partial response class 4 is referred to as PR4 and the extended partial response class 4 is referred to as EPR4.

The conversion polynomial of PR4 in case of (m=1) is as follows.

$$h(D)=(1-D)(1+D)$$

The PR4 equalizer 30 eliminates an inter-code interference component of (1+D) in the conversion polynomial and regards as a convolution code of the partial response system of (1−D). Read data according to a maximum likelihood Viterbi detection of the (1−D) partial response is reconstructed by a maximum likelihood detecting circuit 36 provided subsequent to the PR4 equalizer 30.

On the other hand, the conversion polynomial of the EPR4 in case of (m=2) is as follows.

$$h(D)=(1-D)(1+D)^2$$

In the EPR4 equalizer 32, a waveform equalization of $(1+D)^2$ in the conversion polynomial is performed. Consequently, the read signal which has been equalized becomes the signal of the partial response system of (1−D) in a manner similar to the case of the PR4 equalizer 30, so that the read data can be reconstructed by the maximum likelihood Viterbi detection of the partial response system of (1−D) that is exactly the same.

As such PR4 equalizer 30 and the EPR4 equalizer 32, circuits are constructed by a combination of an A/D converter and an automatic equalizing circuit. As an automatic equalizing circuit, a transversal filter which can control tap coefficients from the outside is used. Subsequent to the PR4 equalizer 30 and EPR4 equalizer 32, a switching circuit 34 is provided. On the basis of a selecting instruction from the MPU 48 as selecting means, the switching circuit 34 switches so as to use the equalizer in which an error rate by the demodulation of the read signal at that time decreases. An equalization output of the PR4 equalizer 30 or EPR4 equalizer 32 which was switched by the switching circuit 34 is supplied to the maximum likelihood detecting circuit 36 as decoding means. The maximum likelihood detecting circuit 36 sets a convolution code when regarding the magnetic converting system as a partial response system of (1−D) demodulates bit to a target and demodulates the hit data in accordance with a maximum likelihood Viterbi algorithm. As decoding by such a maximum likelihood Viterbi algorithm, a detection by an add/compare/select or a detection by a dynamic threshold has been known. An RLL decoder circuit 38 is provided subsequent to the maximum likelihood detecting circuit 36. The RLL decoder circuit 38 corresponds to an RLL encoder circuit 52 provided on the side of a modulating circuit of a writing system. In the embodiment, as an RLL code, for example, (0, 4 ; 8, 9 ; 1) code is used.

In this instance, by expressing a minimum run and a maximum run of bit information 0 by (d) and (k) when converting a sequence (X) to a sequence (Y), respectively, the RLL code is ordinarily called a (d, k) code. Further generalizing, the sequence (X) is divided into blocks on a unit basis called a data word every (n×i) bits and such a data word is converted to a code word of (n×i) symbols in accordance with a predetermined encoding rule. In this instance, a code in which (i)=1 is called a fixed length code and a code in which (i) is equal to a plural number, namely, when it is converted by setting (i>1) and (imax=R) is called a variable length code. Such a block formed code, namely, a block code can be generally expressed as follows.

(d, k ; m, n ; r) code

Other than the (0, 4 ; 8, 9 ; 4) code that is used in the embodiment in FIG. 1, namely, the 8/9 RLL code, a 1/7 RLL code and a 2/7 RLL code are well known as RLL codes. Expressing by a general system, the 1/7 RLL code indicates a (1, 7 ; 2, 3 ; 4) code and the 2/7 RLL code denotes a (2, 7 ; 1, 2 ; 4) code. Further, a VFO circuit 40 as a timing control circuit for generating a clock pulse for timing control is provided for the demodulating circuit portion of the reading system. The read signal which has been equalized by the PR4 equalizer 30 or EPR4 equalizer 32 is supplied through the switching circuit 34 to the VFO circuit 40, so that a PLL control of a clock frequency is executed by using a predetermined sampling point of the equalized read waveform as a reference. The sampling point of the equalized read waveform which is used for control of the VFO circuit 40 differs between the case of selecting the PR4 equalizer 30 and the case of selecting the EPR4 equalizer 32. The switching operation is executed by a switching circuit 42 response to a switching instruction from the MPU 48. A change of the control parameter in association with the switching between the PR4 equalizer 30 and EPR4 equalizer 32 is performed by a switching circuit 24 which receives, a switching instruction from the MPU 48 also with respect to the automatic gain control circuit 22. The read signal equalized by the PR4 equalizer 30 or EPR4 equalizer 32 is inputted to the automatic gain control circuit 22 through the switching circuit 34, thereby performing a gain control for the automatic gain control amplifier 20 so as to set a predetermined sampling point of the equalized read waveform to a specific AGC level. A control point of the equalized read waveform in the automatic gain control circuit 22 also differs in the case where the PR4 equalizer 30 is selected and the case where the EPR4 equalizer 32 is selected. The control point of the automatic gain adjustment is switched by the switching circuit 24. The RLL decoder circuit 38 converts the bit data outputted from the maximum likelihood detecting circuit 36 into the NRZ data by the inverse conversion of the RLL code and, after that, transfers as parallel NRZ data to the upper apparatus through a serial/parallel (S/P) converting circuit 44. In the writing operation, the S/P converting circuit 44 converts the parallel NRZ data transferred from the upper apparatus into the serial NRZ data and supplies to a modulating circuit unit of the writing system. The modulating circuit unit of the writing system is constructed by the RLL encoder circuit 52, a precoder circuit 54, a write precompensating circuit 56, a write FF circuit 58, and a driver circuit 60. In the embodiment, the RLL encoder circuit 52 converts the inputted NRZ data into what is called an RLL 8/9 code. The RLL 8/9 code is 1/(1+D) converted by the precoder circuit 54 and is subjected to a write compensation by the write precompensating circuit 56. After that, the compensated data is transmitted through the write FF circuit 58 and driver circuit 60 and is written to the magnetic disk medium by either one of the write heads 14-1 to 14-4 selected by the head IC circuit 16. The MPU 48 receives an access command from the upper apparatus and decodes and performs the writing or reading operation. In the reading operation, selection information to switch the PR4 equalizer 30 and EPR4 equalizer 32 prepared for a memory 50 on the basis of a head number HH and a cylinder address CC which were designated by the access command is referred, thereby allowing the switching circuit 34 to transmit the output of either one of the equalizers to the maximum likelihood detecting circuit 36. On the basis of the selection information of the PR4 equalizer 30 or EPR4 equalizer 32, the switching of the control point in the automatic gain control circuit 22 and the switching of the timing extraction point in the switching circuit 42 in the VFO circuit 40 are also simultaneously executed by the switching circuit 24.

Figure 2:
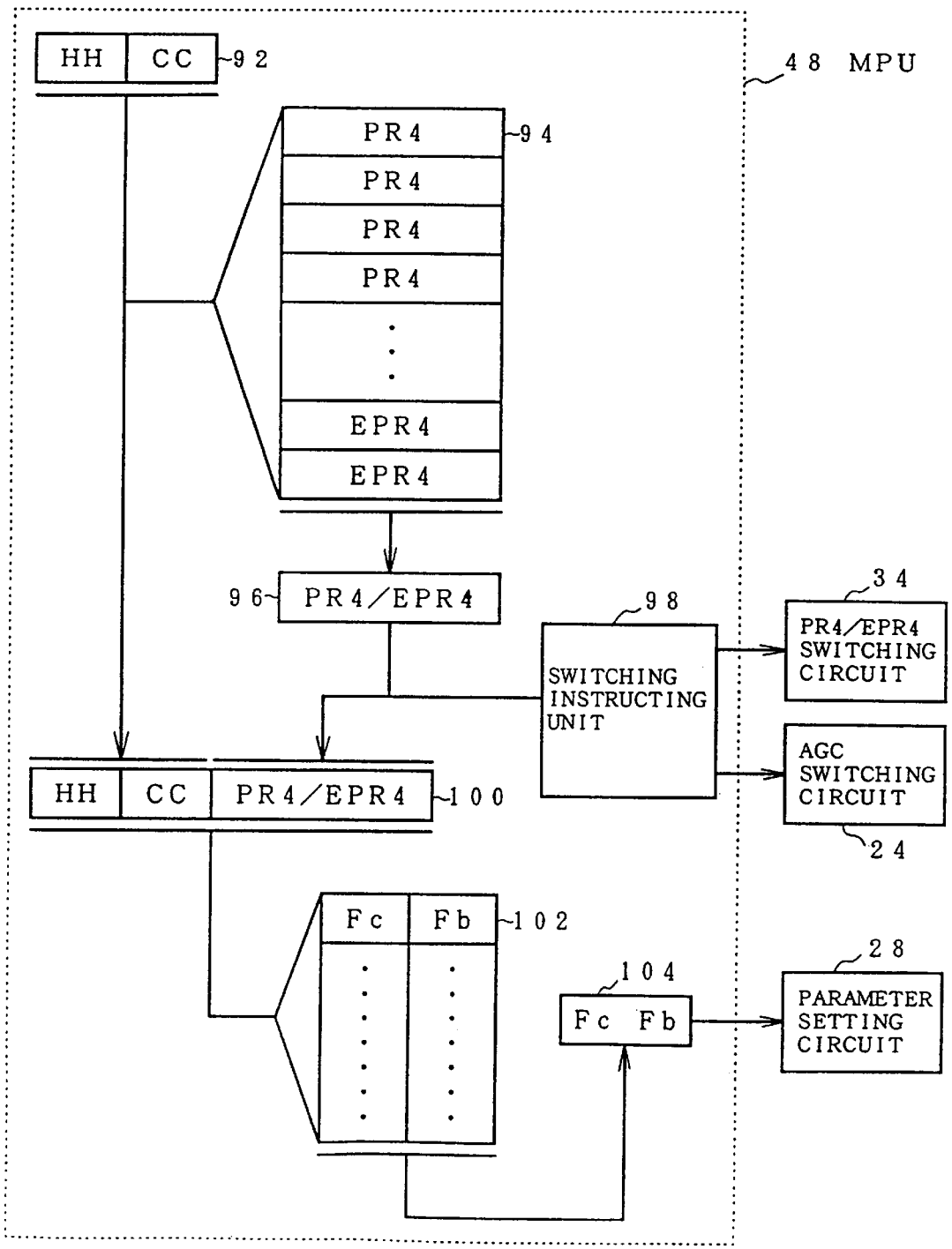
FIG. 2 is a block diagram of a demodulation switching function between the PR4 and EPR4 which is realized by an MPU in FIG. 1.

FIG. 2 is a functional block diagram showing a function of selecting means for selecting either one of the PR4 equalizer 30 and the EPR4 equalizer 32 which can optimally equalize. Such a function is realized by a program control of the MPU 48 in FIG. 1. The head number HH and cylinder address CC designated by a read command are stored in an access register 92. The selection information "PR4" of the PR4 equalizer 30 and the selection information "EPR4" of the EPR4 equalizer 32 have previously been registered in a demodulation switching table 94 as selecting means by using a two-dimensional address that is designated by the head number HH and cylinder address CC as an entry. Therefore, by searching the demodulation switching table 94 by the two-dimensional address of the head number HH and cylinder address CC set in the access register 92, the selection information PR4 or EPR4 at that time can be obtained in an output register 96. The selection information of the output register 96 is given to a switching instructing unit 98, thereby switching to the use of either one of the PR4 equalizer 30 and EPR4 equalizer 32 by the switching circuit 34. On the other hand, the control point of the equalized read waveform is switched by the AGC switching circuit 24 in accordance with PR4 or EPR4. Further, in addition to the head number HH and cylinder address CC in the access register 92, the demodulation selection information PR4 or EPR4 read out from the demodulation switching table 94 is set into an input register 100. The input register 100 searches a filter constant table 102 in which three addresses of the head number HH, cylinder address CC, and demodulation selection information are used as entries. The values of the cut-off frequency Fc and boost Fb which are set into the low pass filter 26 in FIG. 2 have previously been registered in the filter constant table 102 every entry. Therefore, by searching the filter constant table 100 by the address set in the input register 100, the filter constants corresponding to the head number HH, cylinder address CC, and demodulation selection information PR4 or EPR4 are read out into an output register 104. The filter constants are set into the low pass filter 26 in FIG. 1 by the parameter setting circuit 28, thereby switching filter characteristics.

A method of forming the demodulation switching table 94 in FIG. 2 which is used for the switching between the PR4 equalizer 30 and EPR4 equalizer 32 in FIG. 1 will now be described. According to the inventors of the present invention, in the case where the same cylinder address of the same disk medium is demodulated by the same head, it has been confirmed that in the demodulation by the PR4 equalizer 30 and the demodulation by the EPR4 equalizer 32, there is a difference between desired S/N ratios to obtain a predetermined error rate. This is because the partial response of the actual magnetic converting system doesn't perfectly coincide with PR4 and EPR4 which have been presumed. That is, this is because an intercode interference in PR4 or EPR4 doesn't accurately appear in the read waveform by the head and a deviation of a certain degree occurs. According to the invention, therefore, a desired S/N ratio as an S/N ratio of the MR head read signal necessary to obtain a predetermined bit error rate after completion of the maximum likelihood decoding is measured with respect to a standardized linear density (K) that is given by a ratio of a half value width W50 of the read signal of the isolated waveform by the head and a sampling period (T) of the signal. Thus, the result shown in FIG. 3 is obtained as an example.

Figure 3:
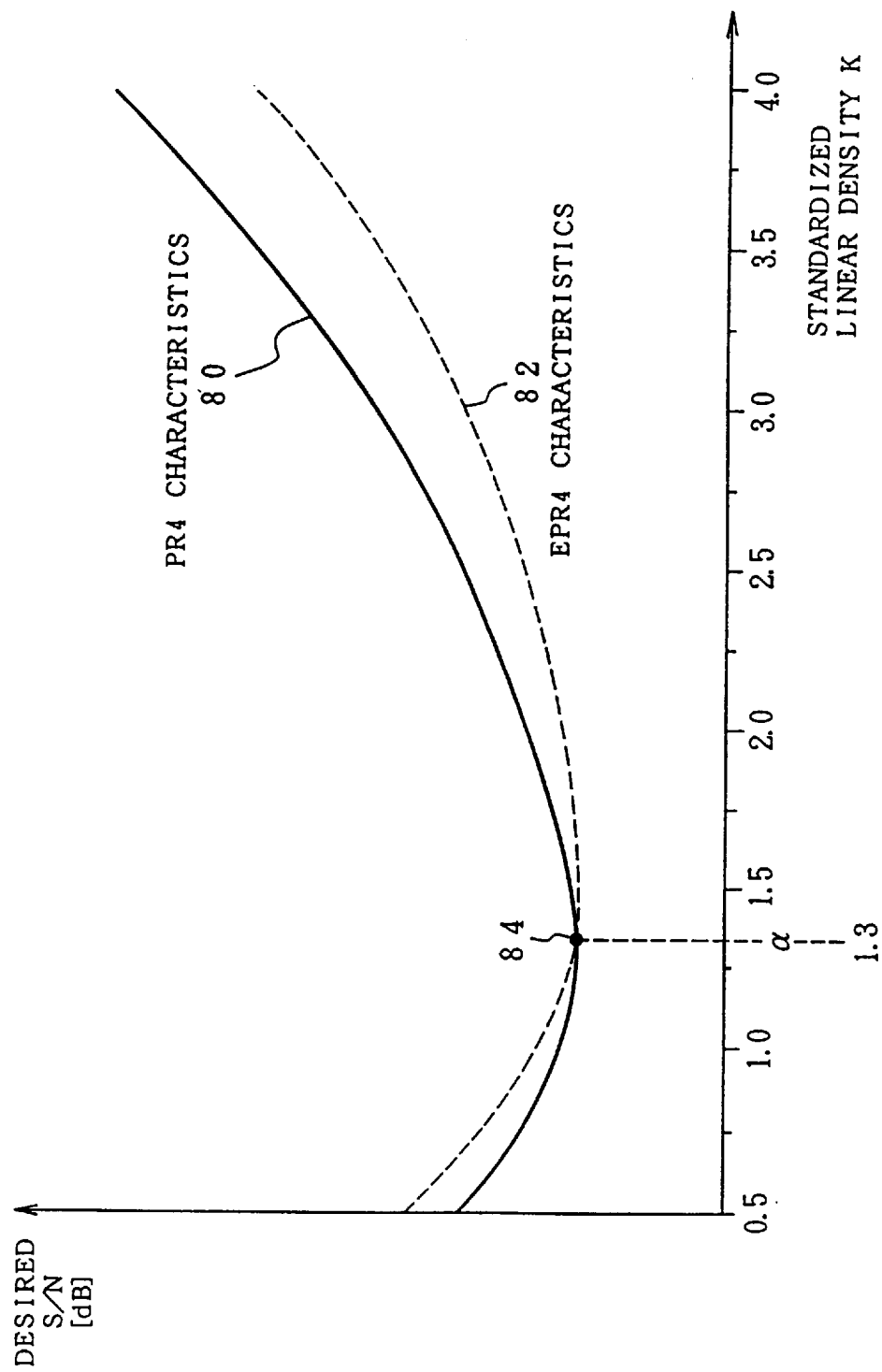
FIG. 3 is a characteristics diagram showing relations of a desired S/N ratio to a standardized linear density with respect to the PR4 demodulation and the EPR4 demodulation.

In FIG. 3, an axis of abscissa indicates the standardized linear density (K) and an axis of ordinate shows the desired S/N ratio. Characteristics curve 80 of a solid line shows the case of using the PR4 equalizer 30. Characteristics curve 82 of a broken line shows the case of using the EPR4 equalizer 32. When the standardized linear density (K) is small, the desired S/N ratio of the PR4 equalizer 30 by the characteristics curve 80 is low and the desired S/N ratio of the EPR4 equalizer 32 is high. When the standardized linear density (K) increases from this state, the difference between both of the desired S/N ratios decreases. When exceeding K=α

($\alpha$=about 1.3) corresponding to a point 84, the relation between the desired S/N ratios is reversed. When the standardized linear density (K) further increases, the desired S/N ratio of the characteristics curve 82 of the EPR4 equalizer 32 is lower than the characteristics curve 80 of the PR4 equalizer 30 and a degree of such a reduction is widened as the standardized linear density (K) increases. As will be obviously understood from the characteristics of FIG. 3, since the desired S/N ratios of the PR4 demodulating system and EPR4 demodulating system differ depending on the value of the standardized linear density (K) of the head read signal, the demodulating circuit is switched to the demodulating circuit in which the desired S/N ratio is small.

Figure 4:
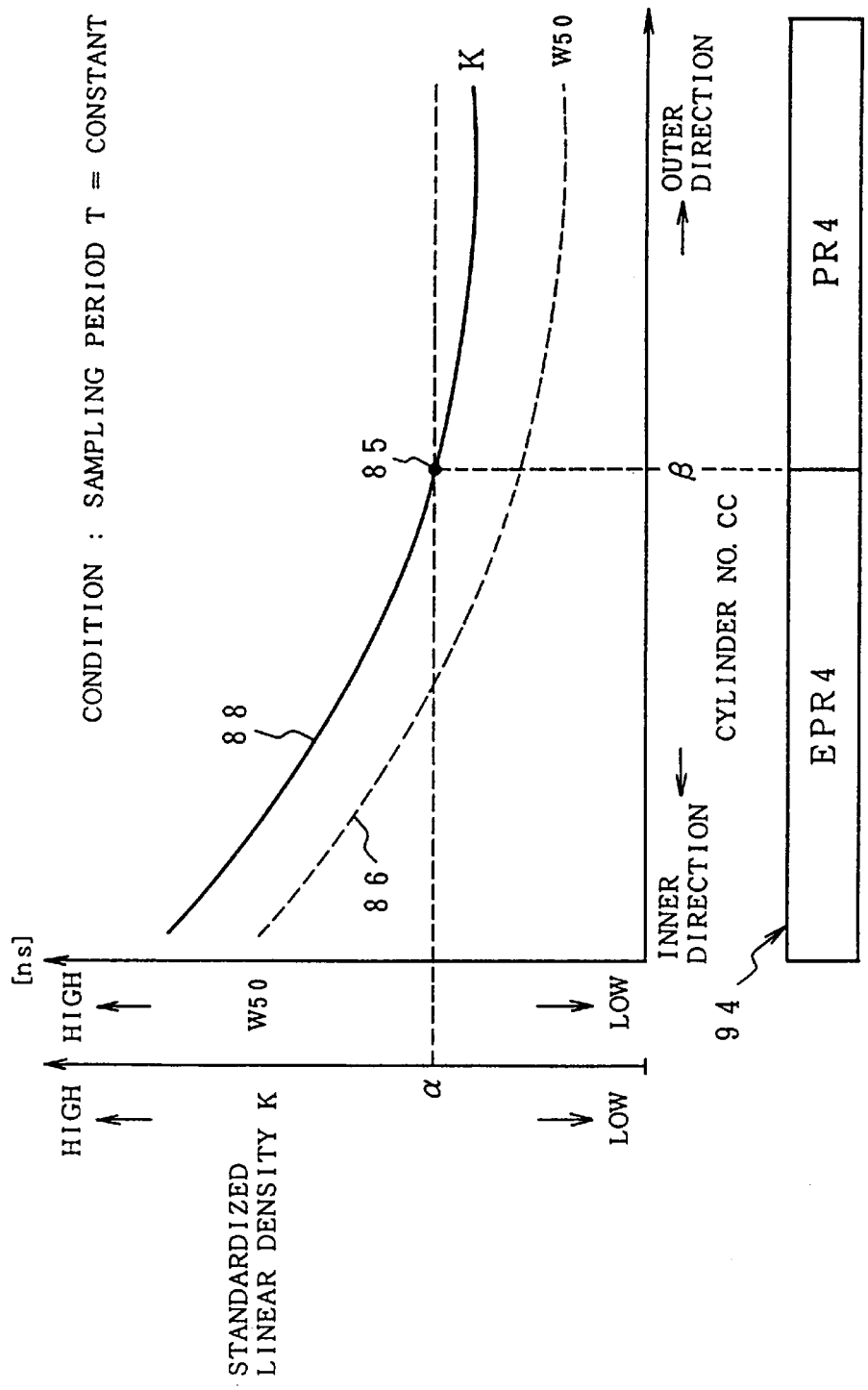
FIG. 4 is a characteristics diagram showing relations between the half value width and the standardized linear density to a cylinder No. in case of CVAR in which a clock period is constant.

FIG. 4 shows a method of selecting PR4 and EPR4 in the constant angular velocity recording (CAVR) in which the sampling period (T) is constant on the basis of the characteristics of FIG. 3 with respect to all of the cylinders of the magnetic disk medium. First, after the isolated waveforms are written for all cylinders of the magnetic disk as targets, they are read out, thereby measuring the half value width W50 of the isolated waveform. The measurement result of the half value width W50 is as shown in a characteristics curve 86. Namely, the half value width of the isolated waveform is large on the inner rim side on which the peripheral velocity is low and decreases as the position approaches the outer rim side on which the peripheral velocity is high. Since the sampling period (T) is constant with regard to all of the cylinders here, the standardized linear density (K) has a value obtained by dividing the half value width W50 of the characteristics curve 86 by the sampling period (T). Thus, the standardized linear density (K) becomes as shown in a characteristics curve 88 obtained by moving the characteristics curve 86 of the half value width W50 in parallel. In the characteristics of FIG. 3, when the cylinder position corresponding to the standardized linear density (K=$\alpha$) at the point 84 where the relation between the desired S/N ratio by PR4 and the desired SIN ratio by EPR4 is reversed is obtained with respect to the characteristics curve 88 of the standardized linear density, the cylinder number CC=$\beta$ which is given at a point 85 is derived. Therefore, as most simplest contents in the demodulation switching table 94 which is used in FIG. 2, the head number HH is ignored and only the cylinder address CC is compared with the cylinder number CC=$\beta$ at the point 84 obtained from FIG. 4. By such a comparison, so long as the cylinder address is located on the outer side than $\beta$, the selection information "PR4" of the PR4 equalizer 30 is stored. So long as it is located on the inner side than the cylinder number CC=$\beta$, the selection information "EPR4" of the EPR4 equalizer 32 is stored. In this way, it is sufficient to form the demodulation switching table 94 in which such selection information has evenly stored.

However, there is a possibility such that each of the characteristics of FIGS. 3 and 4 become another characteristics if the head differs. Therefore, it is desirable to use the demodulation switching table 94 in which the selection information of PR4 and EPR4 which are designated by the 2-dimensional address of the head number and cylinder zone number has been stored as shown in, for example, FIG. 5 rather than the demodulation switching table 94 which is simply divided into two portions as shown in FIG. 4. In the demodulation switching table 94 of FIG. 5, the cylinder addresses are divided into (m) zones shown by zone numbers Z1 to Zm on a unit basis of a predetermined number of cylinders. The demodulation selection information EPR4 or PR4 is stored in each zone every head Nos. HH1 to HH4. A discrimination regarding whether the demodulation selection information PR4 is stored or EPR4 is stored is performed in the following manner. For example, in case of the zone No. Z1, the head is positioned to, for instance, the center cylinder of the zone No. Z1, the isolated waveform is read, and the half value width W50 is obtained. With reference to FIG. 3 by the standardized linear density (K) obtained by dividing the measured half value width W50 by the sampling period (T), the selection information of PR4 or EPR4 is stored on the basis of the characteristics of the lower desired S/N ratio. Thus, the zone No. to switch the PR4 equalizer 30 and EPR4 equalizer 32 becomes peculiar to every head No. and the demodulation system can be more finely switched.

FIG. 6 is a list of parameters to form a demodulation switching table which is used in the constant density recording (CDR). In the magnetic disk medium of the constant density recording, for example, the cylinder address is divided into (m) zones of zone Nos. Z1 to Zm. Peculiar clock periods T1 to Tm are determined for the respective zones. Among the clock periods T1 to Tm, the clock period T1 of the zone No. Z1 of the outermost zone is minimum and the clock period Tm of the zone No. Zm of the innermost zone is maximum. With respect to the zone Nos. Z1 to Zm, half value widths W1 to Wm of the head read waveforms are measured by the value of the representative cylinder or the average value of a plurality of cylinders or the like. Standardized linear densities K1 to Km are obtained by dividing the half value widths W1 to Wm by the clock periods T1 to Tm in the zones, respectively. When the standardized linear densities K1 to Km are obtained for every zone in this manner, with reference to the characteristics of FIG. 3 by the standardized linear densities K1 to Km, PR4 or EPR4 which gives the characteristics curve of a smaller desired S/N ratio between the characteristics curves 80 and 82 is obtained as selection information. The obtained demodulation selection information PR4 or EPR4 is stored at the positions which are determined by the 2-dimensional addresses of the cylinder zone Nos. Z1 to Zm and the head Nos. HH1 to HH4 similar to those in FIG. 5. As another method of forming the demodulation switching table 94, a pattern for measuring the error rate is previously recorded in all of the cylinders of the disk medium, the head read waveform is subsequently switched for the PR4 equalizer 30 and EPR4 equalizer 32 while sequentially designating the head No. and the cylinder address, the error rate of the maximum likelihood detecting circuit 36 in each waveform is measured, and the selection information of the equalizer of a lower error rate is stored. The PR4 equalizer 30 and EPR4 equalizer 32 can be also switched without using the demodulation switching table. That is, in the ordinary state, the equalizer is fixedly switched to the PR4 equalizer 30. If a read error occurs in this state, the equalizer is switched to the EPR4 equalizer 32, thereby recovering. In case of using such a recovery method for the read error, the demodulation switching table 94 is unnecessary.

Figure 7:
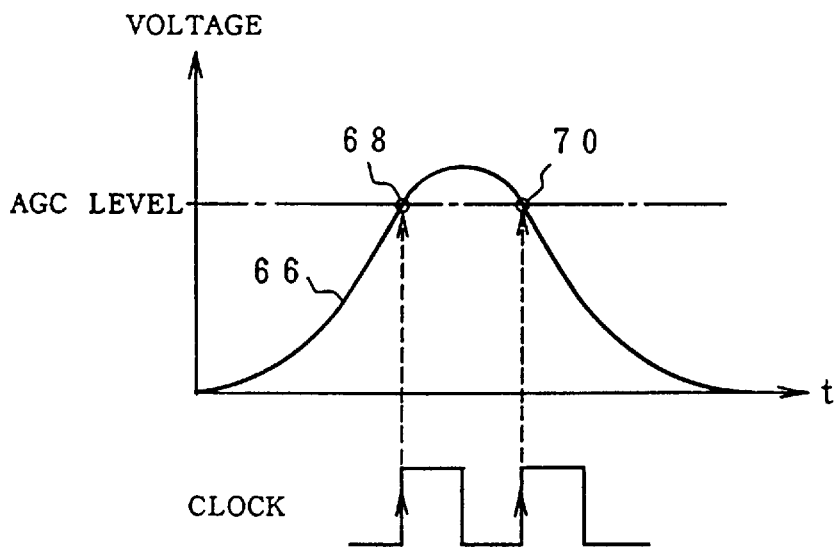
FIG. 7 is an explanatory diagram of a sampling point, an AGC control point, and a timing control extracting point in an equalized read waveform of the PR4.
Figure 8:
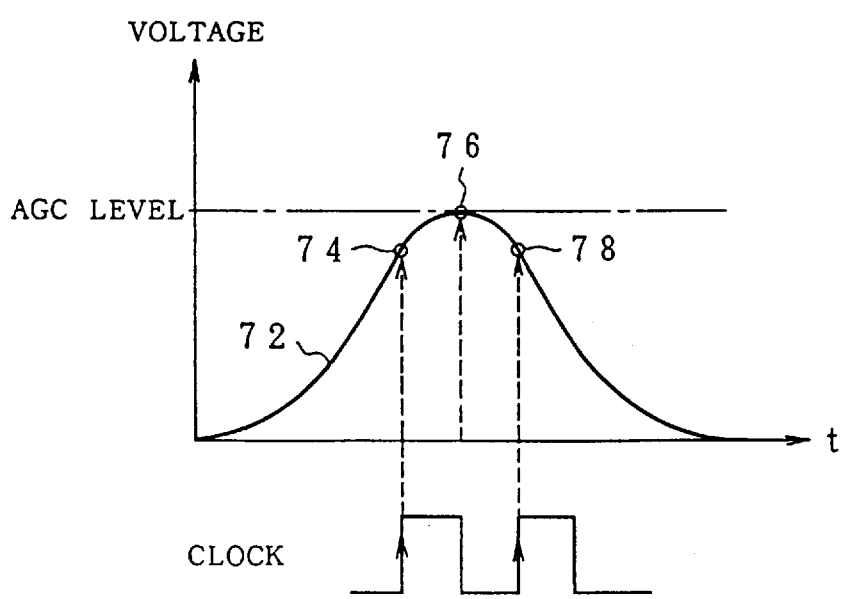
FIG. 8 is an explanatory diagram of a sampling point, an AGC control point, a timing control extracting point in an equalized read waveform of the EPR4.

The switching of the automatic gain control circuit 22 by the switching circuit 24 in association with the switching between the PR4 equalizer 30 and EPR4 equalizer 32 in FIG. 1 and the switching of the VFO circuit 40 by the switching circuit 42 will now be described. FIG. 7 shows an ideal isolated read waveform subjected to the PR4 equalization. FIG. 8 likewise shows an ideal isolated read waveform subjected to the EPR4 equalization. In the PR equalized waveform of FIG. 7, the equalization of a waveform 66, namely, the (1+D) equalization is executed so that points 68 and 70 on both sides of the peak waveform become sampling points. Ordinarily, a pre-equalization by the low pass filter 26 is assembled at the front stage of the PR4 equalizer 30. After a pre-equalization such as to approach the waveform 66 in FIG. 7 is executed by the low pass filter 26, the equalization by the PR4 equalizer 30 is performed.

Similarly, with respect to the EPR equalization of FIG. 8 as well, after the pre-equalization was performed by the low pass filter 26 at the front stage so as to approach an equalizing waveform 72, the equalization of the waveform 72 is executed so that points 74, 76, and 78 come to the sampling points due to the equalization by the EPR4 equalizer 32. In case of the PR equalization waveform 66 in FIG. 7, control points of the equalization waveform by the automatic gain control circuit 22 are set to the sampling points 68 and 70. On the other hand, in case of the EPR equalization waveform 72 in FIG. 8, the control point is set to the sampling point 76 of the peak.

At a timing extraction point for the timing control by the VFO circuit 40, in case of the PR equalization waveform 66 in FIG. 7, the PLL circuit is made operative so that an interval between the sampling points 68 and 70 is equal to a clock period of a clock signal shown in the diagram. Namely, a voltage level at the sampling point 68 and a voltage level at the sampling point 70 are compared and the operation of the PLL circuit is executed so as to set a difference between those voltage levels to zero. On the other hand, with respect to the EPR waveform 72 in FIG. 8, the PLL operation is executed so that an interval between the sampling points 74 and 78 is equal to the period of the clock signal shown in the diagram. That is, the PLL operation is performed so as to set a difference between the voltage levels at the sampling points 74 and 78 to zero.

Figure 9:
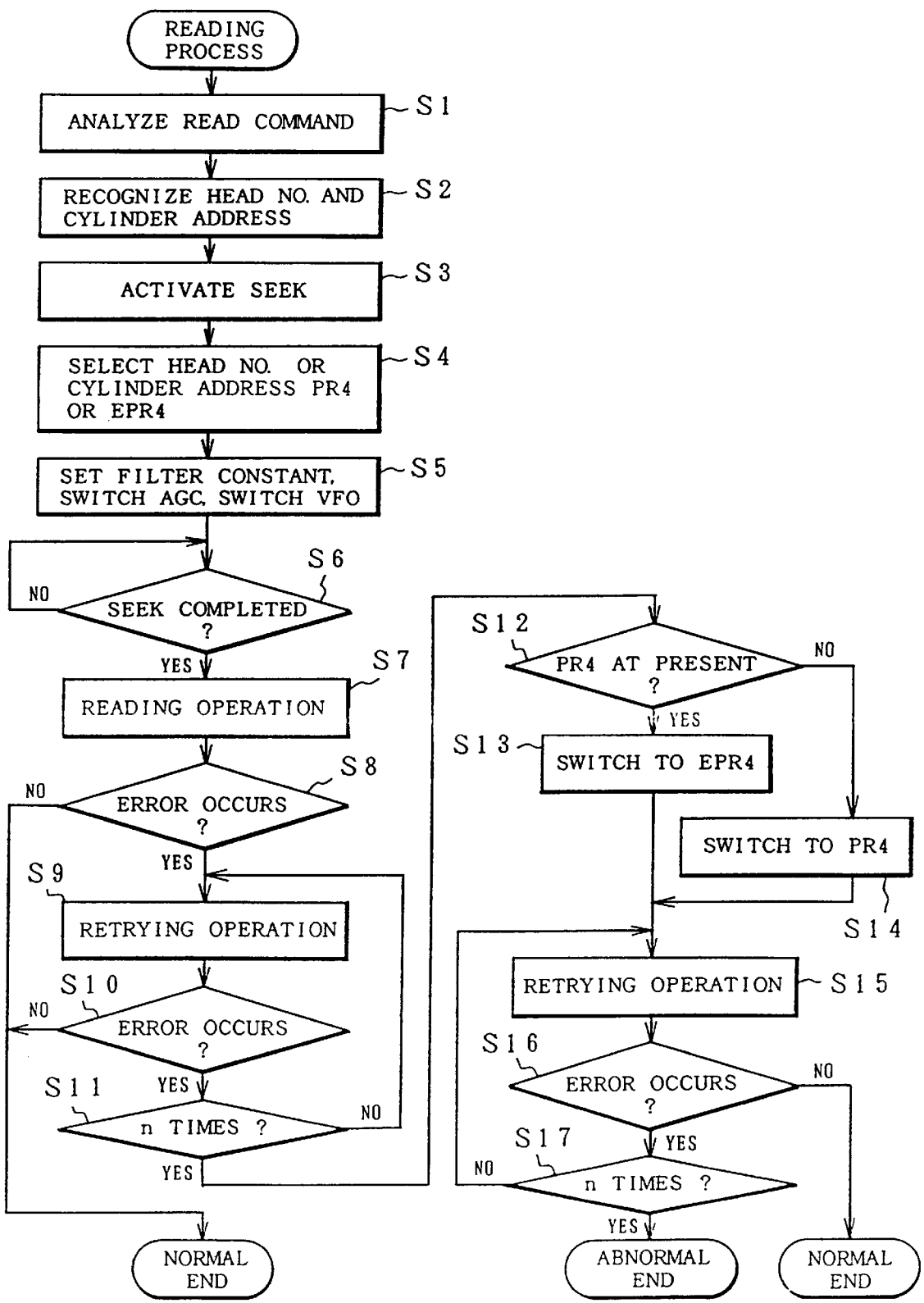
FIG. 9 is a flowchart showing the processing operation of the invention.

FIG. 9 is a flowchart for the reading operation in the embodiment of FIG. 1. First in step S1, a read command generated from the upper apparatus is analyzed. In step S2, the head No. HH and cylinder address CC are recognized. A seeking operation for driving an actuator by the driving of a voice coil motor by a servo control unit (not shown), thereby moving the head to the designated cylinder address is activated in step S3. During the seeking operation, in step S4, either one of the PR4 equalizer 30 and EPR4 equalizer 32 is switched and selected with reference to the demodulation switching table 94 based on the head No. HH and cylinder address CC. In step S5, in correspondence to the PR4 equalizer 30 or EPR4 equalizer 32 selected at that time, the switching of the filter constant by the parameter setting circuit 28, the switching of the control point for the automatic gain control circuit 22, and the switching of the timing extraction point for the VFO circuit 40 are executed. After completion of the above switching operations, the apparatus waits for the completion of the seeking operation in step S6. When the completion of the seeking operation is discriminated, the reading operation is performed in step S7. When read data is normally obtained by the reading operation, it is judged that no error occurs, so that the processing routine is finished as a normal end. If the occurrence of the error is discriminated in step S8, a retrying operation is executed in step S9. With respect to the retrying operation as well, the presence or absence of the occurrence of the error is judged in step S10. When an error again occurs, a check is made in step S11 to see if the number of retrying times has reached a predetermined number (n) or not. When the number of retrying times is equal to (n), step S12 follows. In step S12, a check is made to see if the equalizer has been switched to the PR4 equalizer 30 at present or not. If YES, the equalizer is switched to the EPR4 equalizer 32 in step S13. The switching operations of the parameter setting circuit 28, automatic gain control circuit 22, and VFO circuit 40 are also performed in association with the switching to the EPR4 equalizer 32. In step S12, when the equalizer is not the PR4 equalizer 30 at present, since the equalizer has been switched to the EPR equalizer 32, the equalizer is switched to the PR4 equalizer 30 in step S14. In this case as well, the automatic gain control circuit 22, parameter setting circuit 28, and VFO circuit 40 are also switched to the state corresponding to the PR4 equalizer 30. After completion of the switching of the demodulation in step S13 or S14, the retrying operation is again performed in step S15. When it is assumed that the read error occurred because the selection of the demodulating circuit is improper, the desired SIN ratio is improved by the switching of the demodulation by step S13 or S14. In step S16, no error occurs with respect to the retrying operation and the processing routine is finished as a normal end. With regard to the retrying operation after the switching of the demodulation in step S15 as well, when the occurrence of the error is discriminated in step S16, the retrying operation in step S15 is repeated until the retrying operation of (n) times is discriminated in step S17. If the error cannot be recovered even after completion of the retrying operation of (n) times, the processing routine is finished as an abnormal end.

Figure 10:
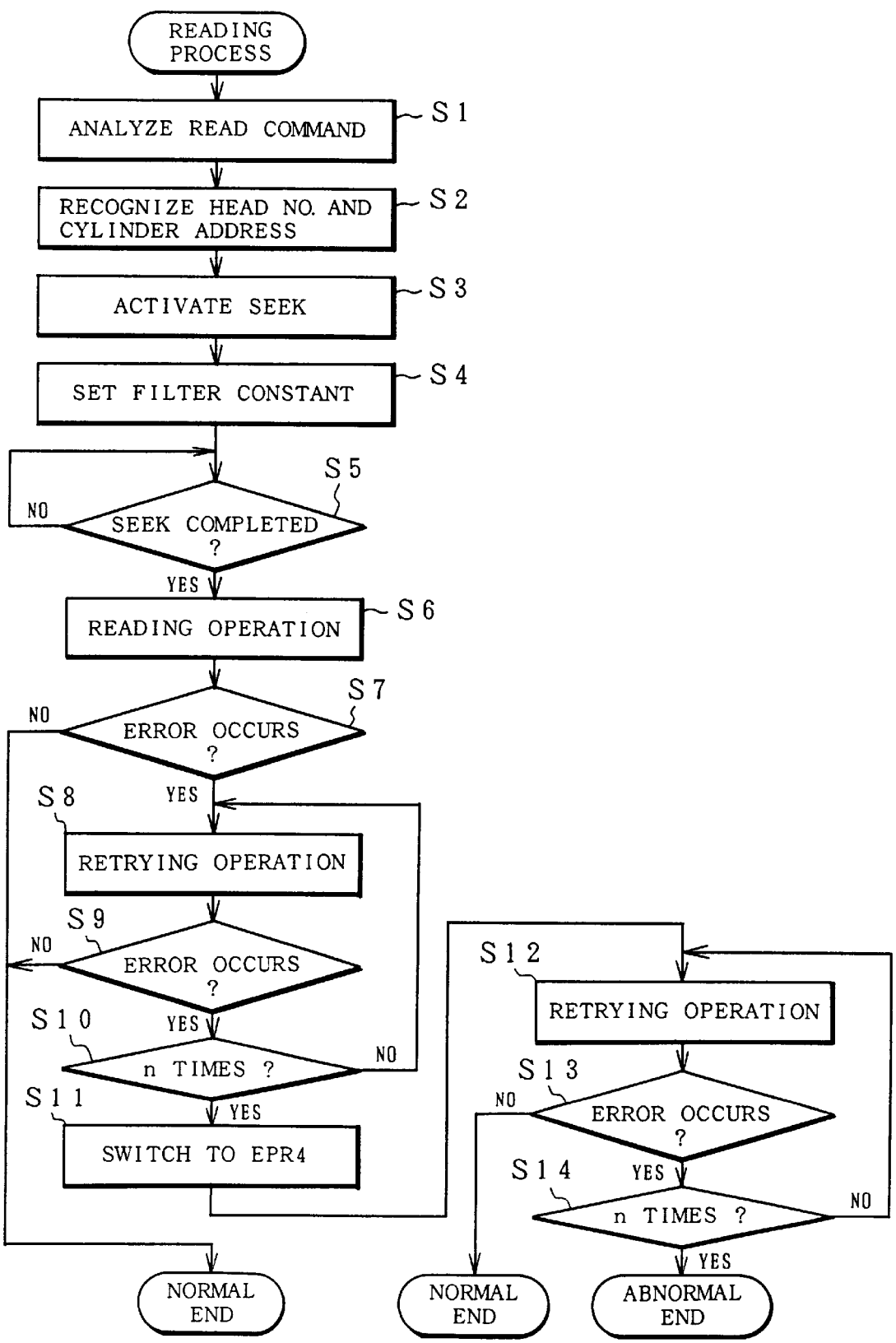
FIG. 10 is a flowchart showing another embodiment of the processing operation of the invention.

A flowchart of FIG. 10 relates to an embodiment of the reading operation according to the invention. The embodiment is characterized in that at the time of the set-up, the PR4 equalizer 30 is fixedly selected and, when a read error occurs, the equalizer is switched to the EPR4 equalizer 32, thereby recovering. First in step S1, the read command is analyzed. In step S2, the head No. and the cylinder address are recognized. In step S3, the seeking operation is started. In step S3 during the seeking operation, the optimum filter constants are set into the low pass filter 26 with reference to the table. In this instance, the demodulating circuit has been switched to the PR4 equalizer 30. When the seeking operation is finished in step S5, the reading operation is executed in step S6. In step S7, when the occurrence of an error is discriminated with respect to the reading operation, the retrying operation is executed (n) times in steps S8 to S10. If the error is not recovered even after the retrying operation of (n) times, the equalizer is switched to the EPR4 equalizer 32 in step S11. In the switching state of the EPR4 equalizer 32, the retrying operation is executed in steps S12 to S14, thereby recovering the error.

Figure 11:
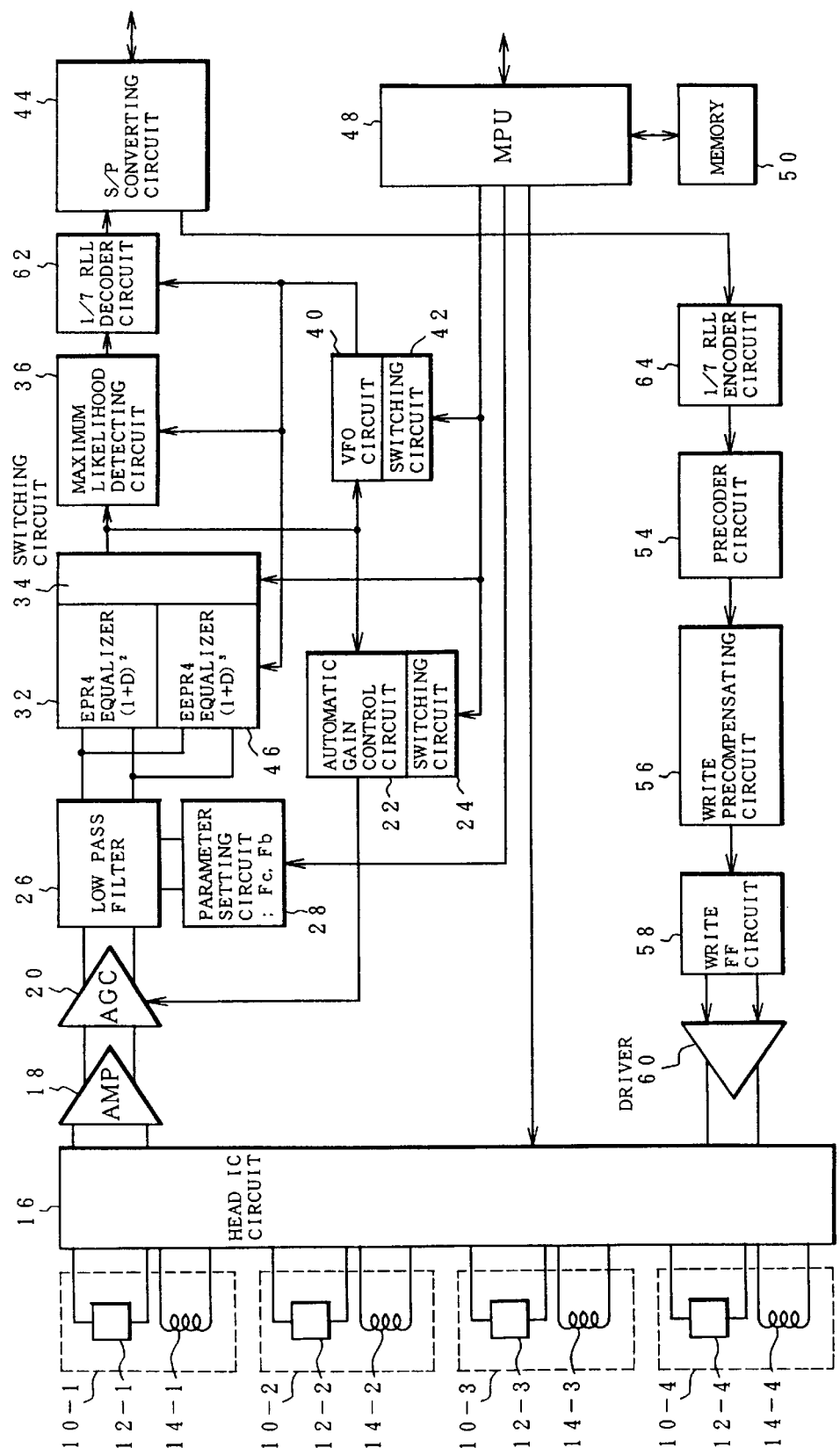
FIG. 11 is a block diagram showing an embodiment of the invention in which the EPR4 demodulation and an EEPR4 demodulation are switched.

FIG. 11 is a block diagram showing another embodiment of the disk apparatus of the invention. The embodiment is characterized in that the EPR4 equalizer (first equalizer) 32 and an EEPR4 equalizer (second equalizer) 46 are provided for the demodulating circuit of the reading system and are switched to the equalizer of a lower error rate, thereby demodulating. The EPR4 equalizer 32 executes the equalization of $(1+D)^2$ by regarding the magnetic converting system as an extended partial response class 4. On the other hand, the EEPR4 equalizer 46 executes the equalization assuming that the partial response system is set to (m=3). A conversion polynomial in this case is $$H(D)=(1-D)(1+D)^3$$

Therefore, the EEPR4 equalizer 46 executes the $(1+D)^3$ equalization. In this case as well, equalization outputs of the EPR4 equalizer 32 and EEPR4 equalizer 46 relate to the partial response system of (1−D). It is sufficient to use the maximum likelihood Viterbi algorithm of the partial response system of (1−D) for the maximum likelihood detecting circuit 36. As a PLL decoder circuit provided subsequent to the maximum likelihood detecting circuit 36, a 1/7 RLL decoder circuit 62 is combined in the embodiment. The 1/7 RLL decoder circuit 62 corresponds to a 1/7 RLL encoder circuit 64 provided for the modulating circuit of the writing system. Further, with respect to the parameter setting circuit 28, automatic gain control circuit 22, and VFO circuit 40, a switching function of the sampling point, AGC control point, and timing extraction point corresponding to the ideal equalization waveform of each of the EPR4 equalizer 32 and EEPR4 equalizer 46 is also provided. As for the EEPR4 equalization waveform, the sampling points 74 and 78 of the EPR4 equalization waveform 72 in FIG. 8 are included and four sampling points are set between those points.

According to the invention as mentioned above, by providing a plurality of equalizing means and selecting the optimum one of the equalizing means in which the error rate can be reduced in accordance with the characteristics of the read waveform of the head, the demodulation in which the desired S/N ratio is further reduced can be realized. The invention largely contributes to the improvement of the error rate of the disk apparatus in which the high processing speed and the high density are realized. By switching to the demodulation of the different partial response system for recovery when the read error occurs, the error which cannot be relieved hitherto can be recovered and the reliability of the apparatus can be largely improved.

According to the embodiment of FIG. 11, although the 1/7 RLL code has been combined to the demodulation of the maximum likelihood detection by EPR4 and EEPR4, a 2/7 RLL code can be also combined to the decoding by the maximum likelihood detection of EPR4 and EEPR4 as another method. Other RLL code can be also properly combined.

In the embodiment of FIG. 1, with respect to PR4ML and EPR4ML, the $(1+D)$ equalization and $(1+D^2)$ equalization by the equalizers are switched and the maximum likelihood detecting circuit uses the common circuit for reconstructing the convolution code of $(1-D)$. However, it is also possible to construct in a manner such that the equalizer is not used but a PR4 maximum likelihood detecting circuit for directly decoding a convolution code of $(1-D^2)$ and an EPR4 maximum likelihood detecting circuit for directly decoding a convolution code of $(1+D-D^2+D^3)$ are provided and switched.

Further, the embodiments of FIGS. 1 and 11 have been shown and described with respect to the equalizations of (PR4 and EPR4) and (EPR4 and EEPR4) as examples. As for the degree of expansion and the class of the partial response, a proper combination can be used as necessary. Further, it is also possible to provide three or more equalizing means and to select the optimum equalizing means. Moreover, the present invention is not limited by the numerical values shown in the embodiments.

What is claimed is:

1. A reproducing apparatus comprising:

first equalizing means of a partial response for equalizing read signals read out from a memory medium by a head and input to said first equalizing means;

second equalizing means of an extended partial response for equalizing said read signals read out from said memory medium by said head and input to said second equalizing means;

decoding means for reproducing information from said memory medium on the basis of the equalization signal output from said first or second equalizing means; and retry means for setting one of said first and said second equalizing means into an operative mode and the other of said first and said second equalizing means into a standby mode at a time of the first reading operation, for switching said operative mode and said standby mode of said first and said second equalizing means when an error occurs for a period of time of retrying operations at a first stage of a predetermined number of times in response to a detection of an error, and for performing retry operations at the second stage of a predetermined number of times after switching between said operative mode and said standby mode.

2. An apparatus according to claim 1, wherein a filter circuit for performing a pre-equalization is provided at a front stage of said first and second equalizing means, and said selecting means switches filter constants of said filter circuit in accordance with the selection of one of said first and second equalizing means.

3. An apparatus according to claim 2, wherein said selecting means switches a cut-off frequency and a boost of said filter circuit in accordance with the selection of one of said first and second equalizing means.

4. An apparatus according to claim 1, further comprising an automatic gain control circuit for controlling a gain of a variable gain amplifying circuit provided at a front stage of said first and second equalizing means, wherein said selecting means switches a sampling point of an equalized read signal that is held at a constant level by said automatic gain control circuit in accordance with a selection of one of said first equalizing means and said second equalizing means.

5. An apparatus according to claim 1, wherein a magnetoresistive element is used as said head.

* * * * *